Figure 1:
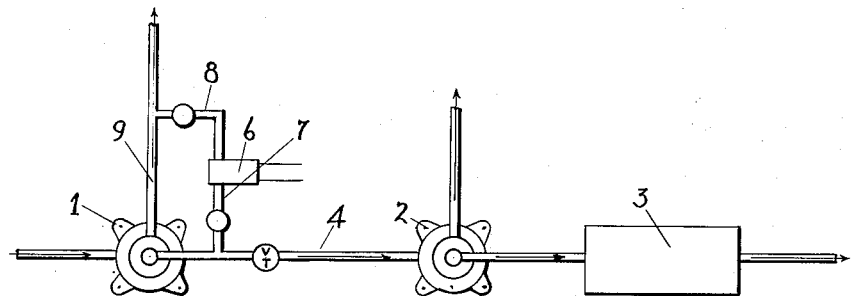

Sept. 11, 1951      P. H. STAAFF      2,567,898

METHOD OF STANDARDIZING CREAM

Filed March 9, 1946

INVENTOR.
Per Hilding Staaff
BY
Busser and Harding
ATTORNEYS

Patented Sept. 11, 1951

2,567,898

UNITED STATES PATENT OFFICE 2,567,898

METHOD OF STANDARDIZING CREAM

Per Hilding Staaff, Alsten, Sweden, assignor to Aktiebolaget Separator, Stockholm, Sweden, a corporation of Sweden Application March 9, 1946, Serial No. 653,421
In Sweden March 19, 1945

6 Claims. (Cl. 31—89)

In the production of butter it is desirable, and it is often required by statute or local governmental regulations, to produce butter having a minimum fat content, e. g., eighty per cent. On the other hand, from the standpoint of economy, it is desirable that the fat content should not much exceed the standard percentage. In any process of manufacture it is therefore desirable to provide means for standardizing the ultimate product so as to produce a butter of predetermined and uniform fat content.

In the usual churning process the effort is to carry out the process from day to day under as nearly as possible uniform conditions, but it is unusual to take any special steps to maintain the desired constant fat content.

In the production of butter by cooling highly concentrated cream, sometimes with, but generally without, moderate working during the cooling, as disclosed, for example, in H. O. Lindgren Patent No. 2,461,117, standardizing of the fat content is generally practiced. After providing a highly concentrated cream having a fat content approximating the minimum fat content desired, it is usual to convey it into one or more containers, in which the cream is collected and, at suitable intervals of time, standardize it to a desired fat content by adding a liquid poor in fat, e. g. skim milk, or by evaporating water. In carrying out the standardization an analysis is made to determine the fat-content of an average sample taken from the container. This procedure has been necessary because hitherto it has not been possible, when separating over a long period of time, to produce a concentrated cream showing sufficiently small variations in its fat content. The procedure is, however, by no means satisfactory. In the first place the practice of a fully continuous working-process is impossible. In the next place, standardizing has to be carried out at a high temperature, both when a liquid poor in fat is added and when water is evaporated. It is, however, impracticable to store cream at a high temperature for a long period of time. Therefore the cream must be cooled after being separated and before being conveyed to the standardizing vessel and then must be re-heated immediately before it is standardized. This involves a considerable complication in the installation.

The present invention has for its object the production, by the cooling process, as distinguished from the churning process, of butter of predetermined and substantially uniform fat content without the necessity of standardizing the concentrated cream, thus greatly simplifying and expediting the manufacture and permitting the whole process to be carried out in a continuous manner. In practicing the process the concentrated cream is obtained by a two-stage centrifugal separation. Prefearbly in both stages, but in at least the last stage, a so-called hermetic separator is used, that is, a separator from which the cream is delivered through an outlet passage sealed from the atmosphere. The cream is preferably directly fed to the cooling apparatus. The necessity for subjecting the concentrated cream to standardization is eliminated in that a cream of a constant predetermined fat content is fed to the second separating stage, which cream is obtained through steps having been taken in the treatment including the first separating stage, to remove any variations in the fat content which may arise in the first separation, for instance, either because of a slow or rapid change in the fat content of the whole milk fed to the separator or because of changes in the whole milk quantity fed to the separating process per unit of time. It has been found that the fat content of the highly concentrated cream is dependent in a high degree on the fat content of the cream fed to the second stage separator. This especially applies to separators of the type above mentioned where the cream is fed to the bowl under pressure and discharged thence through a pipe connected to the separator by means of tightening or sealing devices. It is presupposed that the highly concentrated cream is produced by separating in two stages and that, in the first stage, a cream of a 20 to 30% fat content is obtained; this cream being subsequently concentrated in the second separating stage to a minimum fat content of 80%, and preferably to a fat content not greatly exceeding the minimum.

The fat content of the cream from the first stage can be maintained constant in different ways. For instance, an apparatus may be built into the separator that will indicate any changes in the fat content. The simplest arrangement is to provide, in the cream pipe from the first separator, an aerometer, for instance, in the form of balancing scales, equipped with floating bodies immersed in the skim milk and the cream samples. This known apparatus may be connected in the known way to regulating devices in the separator of the first stage, which are so acted upon that the fat content of the cream discharged from the separator is maintained practically constant by, for example, regulating the back pressure at one of the outlets from the first step centrifuge. Such an apparatus may be provided by anyone skilled in the art.

Instead of such an automatic arrangement, two or more containers may be inserted between the two separating stages. In these containers the cream may be alternately standardized before being fed to the second separating stage, the standardizing thus being carried out before the last separating stage.

In the appended claims, the first stage treatment specified is intended to include the step of centrifuging the whole milk and the passage therefrom to the second stage separator. The term "milk" as used in the claims is intended to include, but not necessarily to be restricted to, whole milk, since the first stage treatment is intended to include the centrifugation of any milk product to produce a milk product having a substantially higher fat content than the milk product fed thereto, but a fat content substantially lower than that produced in the final centrifugal cream concentration step. It will also be understood that while two centrifugal treatments are required, the process does not exclude the employment in series of more than two centrifuges so long as the standardization or regulation previously described is effected in the stage treatment preceding the concentration of the cream to a relatively high fat content.

In Fig. 1 an installation is shown diagrammatically, which is provided with an automatic arrangement for maintaining a constant fat content in the cream. 1 is the first stage separator, 2 the second stage separator and 3 the cooling apparatus. The cream from the separator 2, which is preferably of the so-called hermetic type, is directly conveyed to the cooling apparatus. Also separator 1 may be of the same kind. In the cream pipe 4 there is a regulating device 5, by means of which the fat percentage of the cream from separator 1 can be regulated to a desired value. The regulation is carried out by an apparatus 6, which indicates changes in the fat content of the cream and influences the regulating device 5. The apparatus 6 can be made in any known way, and for instance be of the type disclosed in the U. S. Patent No. 2,174,169. Cream is fed into it through a branch pipe 7, and skim milk through another branch pipe 8, connected to the cream pipe and the skim milk pipe respectively from the separator 1.

The regulator 5 may be simply a throttling valve, as disclosed in said Risberg patent. The regulating impulses from the indicating apparatus 6 are transmitted to the regulator 5 in any suitable manner, for example, as disclosed in said Risberg patent. Thus, if the fat content of the cream is reduced, for instance, then this change is indicated by the apparatus 6, and this indication is used to reduce the cream quantity flowing through the regulator 5, whereby the desired fat content of the cream is re-established.

Figure 2:
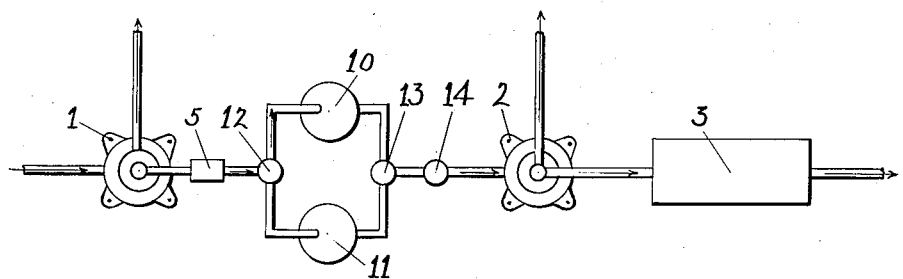

In Fig. 2 an installation is shown diagrammatically, having two containers 10 and 11 in the pipe between the separators 1 and 2, in which containers the cream is standardized. Through two three-way-valves 12 and 13 these containers can alternately collect cream from the first stage separator or deliver cream to the second stage separator. 14 is a pump, placed between the containers 10, 11 and the separator 2, and transporting the cream from the containers into the separator 2. 5 is, as in Fig. 1, a regulating device, for instance a valve regulated by hand, and 3 a cooling device.

In the foregoing, it will be understood that "standardizing" the cream is used in its ordinary sense to denote the usual steps of adding to the cream a liquid poor in butter fat, to reduce the percentage of butter fat in the cream to the desired value, or evaporating or otherwise removing water from the cream to increase the percentage of butter fat therein.

What I claim and desire to protect by Letters Patent is:

1. The method of continuously producing concentrated cream of high butterfat content approximating that of butter and maintaining said fat content substantially constant as the concentrated cream is produced, which comprises subjecting milk to a continuous treatment including the centrifugal separation from the milk of a cream of a butterfat content substantially lower than that of the final product, then continuously subjecting the separated cream to a centrifugal separation in which there is separated therefrom a cream having substantially the desired butterfat content of the final product, and in the first stage treatment above specified, regulating the butterfat content of the cream passing to the second centrifugal separating stage to maintain substantially constant the butterfat content thereof notwithstanding variations in conditions, such as changes in the butterfat content of the milk or in the milk quantity fed to the locus of first centrifugal separation per unit of time, which would otherwise substantially vary the butterfat content of the low butterfat cream.

2. The method defined in claim 1 in which the stream of high butterfat cream between the locus of the second centrifugal separation and the locus of cooling is sealed from the atmosphere.

3. The method defined in claim 1 in which the stream of low butterfat content is fed to the locus of the second centrifugal separation through a passage closed to the atmosphere.

4. The method defined in claim 1 in which the regulation of the fat content of the cream in the first stage treatment includes standardizing the fat content of the cream of low fat content after the same is delivered from the first centrifugal separating step and before the same is subjected to the second named centrifugal cream concentrating treatment.

5. The method defined in claim 1 in which the regulation of the fat content of the cream in the first stage treatment includes varying the back pressure at one of the outlets from the locus of the first specified centrifugal separation in accordance with variations in the fat content of the milk.

6. The method defined in claim 1 in which the regulation of the fat content of the cream in the first stage treatment includes varying the back pressure at one of the outlets from the locus of the first specified centrifugal separation in accordance with variations in the quantity of milk fed to the locus of separation per unit of time.

PER HILDING STAAFF.

REFERENCES CITED

The following references are of record in the file of this patent:

UNITED STATES PATENTS

| Number | Name | Date |
|---|---|---|
| 1,485,702 | North | Mar. 4, 1924 |
| 1,791,069 | Wendt | Feb. 3, 1931 |
| 2,174,169 | Risberg | Sept. 26, 1939 |
| 2,414,837 | Riggs | Jan. 28, 1947 |
| 2,461,117 | Lindgren | Feb. 8, 1949 |

FOREIGN PATENTS

| Number | Country | Date |
|---|---|---|
| 453,530 | Great Britain | Sept. 14, 1936 |
| 691,386 | Germany | May 24, 1940 |

OTHER REFERENCES

"Machinery and Equipment for the Meat Industry," Catalogue No. 10, page 190, published by the Allbright-Nell Co.